United States Patent
Deacon

[15] 3,675,397
[45] July 11, 1972

[54] METHOD AND APPARATUS FOR REMOVING ENTRAINED DUST PARTICLES FROM A GASEOUS STREAM

[72] Inventor: James S. Deacon, 4492 Camellia Lane, North Olmsted, Ohio 44070

[22] Filed: Dec. 9, 1970

[21] Appl. No.: 96,303

[52] U.S. Cl. ................................. 55/227, 55/230, 55/257, 261/92, 261/DIG. 54
[51] Int. Cl. ....................................................... B01d 47/10
[58] Field of Search ....................... 55/89, 83, 84, 86, 91, 227, 55/228, 229, 230–232, 257; 261/DIG. 9, DIG. 54, 62, 83, 84, 92, 115, 118

[56] References Cited

UNITED STATES PATENTS

| | | | |
|---|---|---|---|
| 3,488,039 | 1/1970 | Ekman | 261/DIG. 54 |
| 3,544,087 | 12/1970 | McIlvaine | 55/229 |
| 2,172,304 | 9/1939 | Wintermute | 55/227 |
| 3,495,813 | 2/1970 | Marenghi et al. | 55/86 |
| 3,427,006 | 2/1969 | Oiestad | 261/DIG. 54 |
| 3,212,235 | 10/1965 | Markant | 55/89 |

*Primary Examiner*—Charles N. Hart
*Attorney*—McCoy, Greene & Howell

[57] ABSTRACT

An apparatus for removing entrained solid particles from a gaseous stream using a wet-type dust collection system embodying the venturi principle. Water droplets are introduced into the particle laden gaseous stream upstream of the venturi throat by means of rotating drums having a lower surface portion immersed in a water trough. The rotating drums pick up water on their surfaces and propel small droplets tangentially outward in the form of a spray. The venturi throat is defined in part by a pair of rollers journaled for free rotation and having parallel axes spaced so that adjacent surfaces of the rollers define between them a restriction. The force of surface friction between the roller surfaces and the moving stream causes free rotation of the rollers thus reducing frictional resistance to stream flow and distributing erosion over a relatively large area.

6 Claims, 3 Drawing Figures

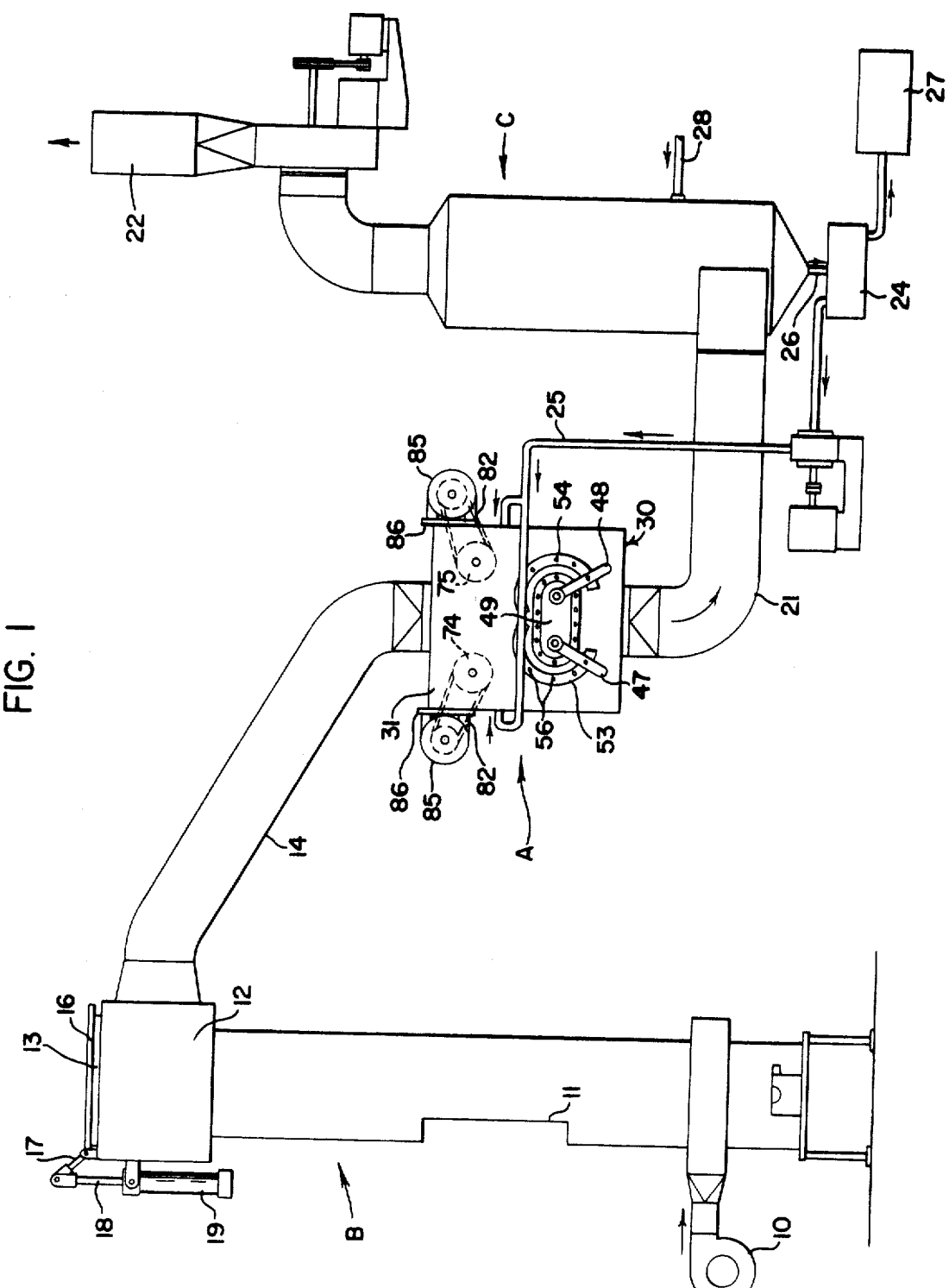

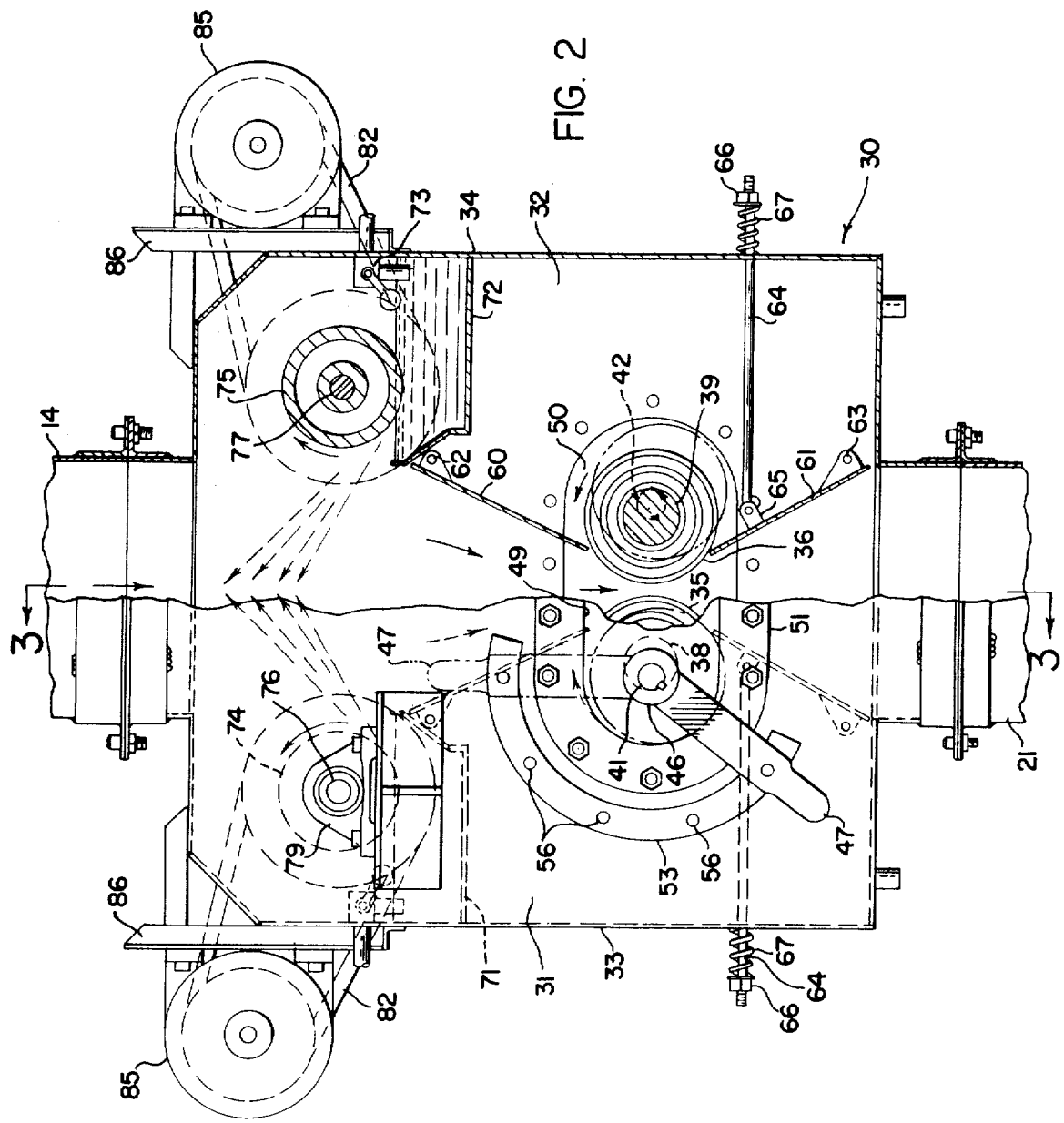

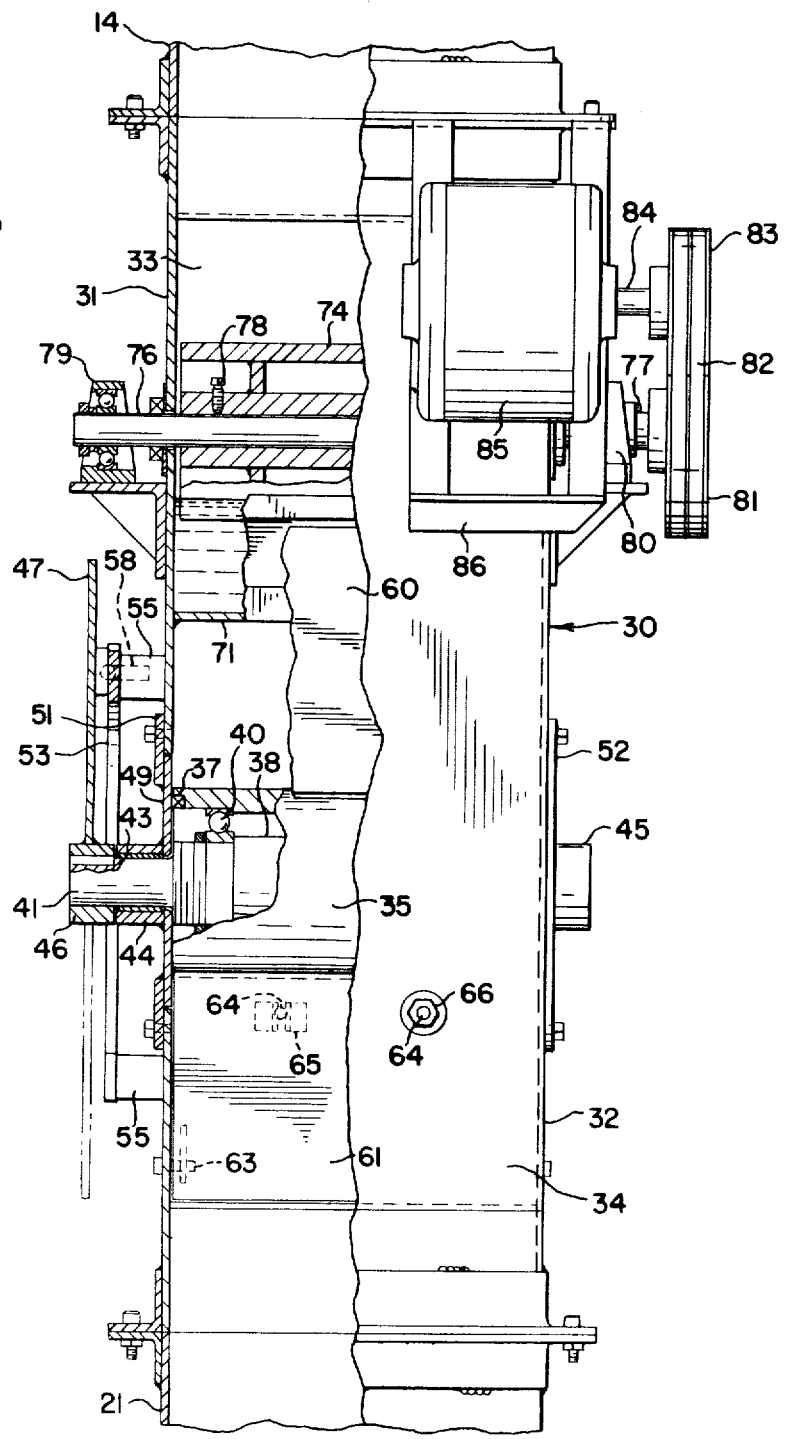

3,675,397

METHOD AND APPARATUS FOR REMOVING ENTRAINED DUST PARTICLES FROM A GASEOUS STREAM

BACKGROUND OF THE INVENTION

This invention relates to wet-type dust scrubbers such as are used for purifying dust laden gases and especially to a venturi-type dust scrubber that uses impingement of the dust particles on small water droplets to capture or agglomerate the dust. The venturi effect assists in the atomization of the water droplets and causes beneficial turbulence in the gaseous stream.

The agglomeration of the dust particles by the water droplets results from at least two factors. One factor is the impingement of the fast moving dust particles on the finely atomized water droplets which are initially (i.e. just after injection) moving at a much slower relative velocity in the stream. The high relative velocity of a dust particle as it strikes a water droplet results in the "capture" or agglomeration of the particle by the water.

The second factor is the formation of condensation on the dust particles as they pass through the venturi throat due to the reduction in fluid pressure. This pressure drop combined with the vapor-saturated condition of the gas achieved by injecting the water causes condensation to form on the particles due to the Joule-Thompson effect with resulting agglomeration of the particles.

One of the most important factors affecting the operation of venturi-type dust collectors is the effectiveness of the spraying of water into the moving stream. According to most current practices spray nozzles are used to inject the water usually at right angles to the stream flow. This system has the disadvantage that contaminated scrubbing water cannot be reused even if it is partly clarified. Any attempt to reuse scrubbing water containing only a small volume of contaminates would result in plugging up of the nozzle orifices.

One method of introducing water particles in a way that permits reuse of partially contaminated scrubbing water is that of flowing the water over a weir using continuous pressure that causes water to overflow an edge of a trough and fall into the path of the dust laden gaseous stream. The contaminated water may be clarified using for example the method and apparatus of my copending U.S. Pat. application Ser. No. 831,180 filed June 6, 1969. The clarified water may then be recirculated back through the system. While this "waterfall" method has certain advantages it fails to achieve optimum disintegration of water droplets into a fine atomized spray which is necessary in order to achieve maximum agglomeration of dust particles and resulting high efficiency. For the purpose of this description the word efficiency means that portion of the total volume of dust entrained in the gaseous stream, that is removed by the scrubbing system, the removed portion being expressed as a percentage of the total volume of dust.

Another problem occurring in prior art venturi-type dust scrubbers is the erosion of the surfaces forming the venturi throat. Due to the high stream velocity occurring in the throat and the constriction of the stream, the particles, which are often quite abrasive, strike the throat surface and erode the material. Over a period of time the erosion results in a variation in the cross sectional dimensions of the venturi throat and changes the throat configuration. This results in a reduction in the effectiveness of the venturi in agglomerating the dust particles and thus reduces the overall efficiency of the system.

Another problem is that of providing a venturi-type dust scrubber that is sufficiently flexible to handle wide variations in stream velocity. The optimum configuration or geometry of the venturi throat will depend of course upon the stream velocity and where the velocity is considerably different from that for which the throat was designed the optimum efficiency cannot be achieved.

The apparatus of the present invention however satisfies the difficulties indicated above and affords other features and advantages heretofore not obtainable.

SUMMARY OF THE INVENTION

It is among the objects of the invention to provide a wet-type dust collection system using a venturi-type dust scrubber that is capable of operation for long periods of time without cleaning and repair.

Another object is to provide a venturi-type dust scrubber wherein the erosion caused by abrasive particles striking the surfaces of the venturi throat is substantially reduced.

Still another object is to provide improved means for introducing a spray of water into a dust laden gaseous stream entering a dust scrubber in such a way that the condition of the water and the amount of contaminates contained therein will not effect the overall operation.

A further object is to provide a wet-type dust collector with a venturi throat wherein the configuration and dimensions of the throat can be adjusted to provide optimum geometry under varying conditions of stream velocity.

These and other objects are accomplished by means of an improved throat wet-type dust collector construction wherein a venturi throat is interposed in the path of a gaseous stream having entrained dust particles and wherein an inlet and outlet is provided for the stream. According to the invention water droplets are introduced into the path of the stream by means of one or more water troughs and one or more driven spray drums, each having a portion of its surface immersed below the surface of the water in the respective trough so that by rotating the drum, water that clings to its surface is propelled tangentially into the path of the stream in the form of small droplets that are mixed into and carried by the stream. A pair of cylindrical rollers with spaced parallel axes, journaled in the unit are used to define the venturi throat. The rollers have portions of their respective surfaces positioned on opposite sides of the stream to define therebetween a restriction. Since the rollers are journaled for free rotation the frictional force between the surface of the rollers and the gaseous stream causes rotation of the rollers so that any erosion of the throat forming surfaces is distributed uniformly around the surfaces of the rollers. Also resistance to stream flow resulting from surface friction is reduced due to the relatively small differential between the surface velocity of the rollers and the velocity of the particles in the stream.

Also associated with the unit is a means for removing the agglomerated dust particles and water droplets from the stream after the stream leaves the scrubber.

BRIEF DESCRIPTION OF THE DRAWINGS

FIG. 1 is an elevational view in somewhat diagrammatic form illustrating a foundry cupola installation having a wet-type dust scrubber using a venturi principle for removing dust particles from the foundry gases;

FIG. 2 is a fragmentary elevational view on an enlarged scale of the dust collector of FIG. 1 with parts broken away and shown in section for the purpose of illustration;

FIG. 3 is an elevational view of the dust scrubber of FIG. 2 with parts broken away at the line 3—3 of FIG. 2, and shown in section for the purpose of illustration.

DESCRIPTION OF THE PREFERRED EMBODIMENT

Referring more particularly to the drawings and initially to FIG. 1 there is shown a dust scrubber A adapted to agglomerate particle laden gases from a foundry cupola B. The water droplets and agglomerated dust particles that are present in the gaseous stream leaving the dust scrubber A are separated from the stream in an air-water separator C and a portion of he contaminated water is subsequently reused in the scrubber A after clarification. Air is forced into the cupola B by a blower 10 and the charge is introduced through a charging door opening 11. The resulting gaseous combustion products and entrained dust particles flow into a dry cap 12 with a direct outlet 13 to atmosphere and also a bypass conduit 14 that delivers the gaseous stream to the scrubber A.

Under normal operating conditions exit of gases through the outlet 13 is blocked by means of a valve unit that includes a valve plate 16 to close the outlet 13. The plate 16 is controlled by means of a crank arm 17 operated by the piston rod 18 of an air cylinder 19. Normally the valve plate 16 will be opened only when the rate of gas flow from the cupola B exceeds the flow rate capacity of the scrubber A. Under normal operating conditions all of the particle laden gases will be passed to the scrubber A through the conduit 14.

The gases exit the scrubber A through an exit conduit 21 that delivers the gaseous product containing agglomerated dust particles and water droplets to the separator C. The separator C has an exhaust stack 22 which exhausts the purified gases to the atmosphere. within the separator C the gases take up a helical path of travel and the resulting centrifugal action drives the agglomerated dust particles and water droplets to the wall of the separator casing where they drip downward to a sludge drain line 26. From the line 26 the contaminated water or sludge is delivered to a clarifier 24 shown diagrammatically in FIG. 1. The clarifier may be for example one of the type disclosed in my copending U.S. Pat. application Ser. No. 831,180 filed June 6, 1969. From the clarifier 24 the clean or clarified water is pumped through a line 25 for recirculation back to the scrubber A. That portion of the contaminated water that is left in the form of sludge is delivered to a sludge bed or dewatering unit 27 (shown diagrammatically in FIG. 1) or other means for disposal. It is expected under typical circumstances that about 90 per cent of the scrubbing water may be returned or recirculated to the dust scrubber A while the remaining 10 per cent is removed. Accordingly additional water must be continuously supplied and this is accomplished through the water supply line 28.

The dust scrubber A will be best understood with reference to FIGS. 2 and 3 and comprises an enclosure 30 formed for example of steel plate. The enclosure 30 has a generally rectangular or box-like form with a front wall 31, a rear wall 32 and end walls 33 and 34. Located within the enclosure 30 are two venturi throat rollers 35 and 36 mounted with their respective axes parallel to one another and perpendicular to the front and rear walls 31 and 32 with their surfaces defining a restriction zone therebetween that serves as a part of the venturi throat for the scrubber A. The rollers 35 and 36 are sealed relative to the front and rear walls 31 and 32 of the enclosure 30 by means of sealing rings 37 and are journaled for free rotation on non-rotating axles 38 and 39 respectively, by means of ball bearing units 40. It is particularly important that the venturi throat rollers 35 and 36 be mounted on their respective axles 38 and 39 to provide a minimum of resistance to their free rotation.

The rollers 35 and 36 are preferably formed of stainless steel or other corrosion resistant metal and preferably have surfaces with a low coefficient of friction. For example the metallic surfaces may be treated such as by an electroplating process to provide a low friction, corrosion resistant surface or may in fact have their surfaces coated with a low friction hydrocarbon material such as "TEFLON."

The axles 38 and 39 each have eccentric stub shafts 41 and 42 extending from their opposite ends, the shafts of each axle being coaxial with one another. The stub shafts 41 and 42 are each journaled in a bushing 43 mounted in each of two bearing blocks 44 and 45 respectively. The bearing blocks 44 and 45 are mounted on the front wall 31 and ear wall 32 respectively of the enclosure 30. The eccentric stub shafts 41 of each of the venturi throat rollers 35 and 36 have a longer axial length than the stub shafts 42 at the opposite ends, and have an annular sleeve 46 keyed thereto. Welded to each of the sleeves 46 is one of two positioning levers 47 and 48 which may be used to turn the stub shafts 41 and 42.

It will be seen that turning of the eccentric stub shafts 41 and 42 about their axis causes a change in the position of the axes of the respective venturi rollers 35 and 36 and thus changes the spacing between the venturi rollers 35 and 36 to vary the size of the venturi throat.

In order to facilitate the mounting and removal of the venturi rollers 35 and 36 and their associated structure the front and rear walls 31 and 32 of the enclosure 30 are provided with oval shaped cut outs. These are closed by closure plates 49 and 50, the plates being secured to the front wall 31 and rear wall 32 respectively by means of perimetric flanges 51 and 52 that are bolted to the respective walls. The bearing blocks 44 and 45 are welded at the appropriate positions to the closure plates 49 and 50 so that the rollers 35 and 36 are integral with the closure plates and their respective flanges 51 and 52.

As indicated above the spacing between the surfaces of the venturi rollers 35 and 36 can be varied by means of the positioning levers 47 and 48 respectively. In order to secure or fix the positioning levers 47 and 48 at a desired roller spacing a pair of semi-circular locking bars 53 and 54, one for each positioning lever 47 and 48, are attached to the front wall 31 of the scrubber enclosure 30 by means of spacer brackets 55. A number of positioning holes 56 are formed in the locking bars 53 and 54 at spaced locations in order that a number of different spacing selections can be made. Each of the positioning levers 47 and 48 has a hole 57 that registers with any of the holes 56 so that the respective levers may be secured by means of a locking pin 58.

The venturi throat is also defined in part by means of upper and lower throat plates 60 and 61 respectively which extend from front to rear parallel to the axes of the respective rollers 35 and 36. The upper throat plates 60 are so arranged as to cause the air stream entering through the inlet 14 to converge to the space defined by the adjacent roller surfaces while the lower throat plates 61 cause the stream to diverge toward the exit conduit 21.

The throat plates 60 and 61 are pivotally mounted by means of hinge pins 62 and 63 respectively in order that the positions of the plates 60 and 61 may be adjusted. The throat plates 60 and 61 must be capable of pivotal movement about their respective axes so as to accommodate different positions of adjustment of the venturi rollers 35 and 36. The upper throat plates 60 rest at their lower edges and by virtue of their own weight against the surfaces of the respective rollers 35 and 36 and the rest position is dependent upon the particular adjustment of the respective rollers. Other means for mounting and adjusting the upper throat plates 60 may of course be employed in order to eliminate any contact between the bottom edges of the plates 60 and the surfaces of the respective rollers 32 and 33.

The lower throat plates 61 are held in a generally upright position by means of rods 64 pivotally connected at one end to a bracket 65 on their respective plate 61 and which extend outwardly through the end walls 33 and 34 of the enclosure 30. The outwardly extending ends of the rods 64 have threads formed thereon to receive tensioning nuts 66 that retain springs 67 between the inner faces of the nuts and the surface of the respective end walls 33 and 34.

Located in the upper portion of the scrubber enclosure 30 adjacent the end walls 33 and 34 are two water troughs 71 and 72 which contain a supply of water with a level almost to the top of the walls of the troughs 71 and 72. The water level is maintained constant by means of a float valve assembly 73 of conventional type and which forms no part of the invention.

Operatively associated with each of the troughs 71 and 72 is one of two spray drums 74 and 75 that are secured to shafts 76 and 77 by means of lock screws 78. The ends of the shafts 76 and 77 extend through the front wall 31 and rear wall 32 of the enclosure 30 and are journaled in bearing blocks 79 and 80. The ends of the shafts 76 and 77 that extend through the front wall 31 of the enclosure 30 each have a pulley 81 keyed thereto, each pulley 81 being driven by a belt 82 which in turn is driven by a motor pulley 83 mounted on the output shaft 84 of a drive motor 85. Each of the drive motors 85 is mounted on a motor bracket 86 bolted to the enclosure 30.

The drums 74 and 75 are so mounted that the bottom surface portions extend into and below the surface of the water in the troughs 71 and 72. Thus as the drums are driven, water that clings to the surface of the drums due to surface tension is quickly propelled tangentially from the surface by centrifugal force to cause a continuous spray. The spray pattern is determined by the speed of the drums and will normally be adjusted to provide approximately the pattern indicated in FIG. 2 so that an optimum spray is produced in the path of the incoming gaseous stream.

The surfaces of the drums are preferably provided with a treatment or layer of material which resists formation of scale and other deposits during operation. It should be noted however that the formation of scale and other deposits will not greatly hamper the spraying operation of the drums since as long as the surfaces thereof extend below the surface of the water in the troughs, they will continue to pick up and spray the water into the path of the incoming gaseous stream. Although deposits may collect in the bottom of the troughs 71 and 72 this again will not affect the operation although it may be desirable to clean the troughs at certain time intervals to remove scale deposits etc. It will be apparent that scrubbing water may be easily reused with this system since the presence of contaminates in the water will not affect the spraying operation.

OPERATION

When the foundry cupola B is to be put into operation the scrubber A is initially readied by supplying enough water to the troughs 71 and 72 to fill them to the level at which the water is shut off by the float valves 73. The motors 85 are then started and adjusted in speed until an optimum water spray pattern is provided in the path of the incoming gaseous stream. Then using the positioning levers 47 and 48, the venturi throat rollers 35 and 36 are adjusted to an approximate position to satisfy the expected velocity conditions etc. resulting from the operation of the foundry cupola B. When the cupola is put into operation the air cylinder 19 will close the valve plate 16 and all of the gases will be directed from the dry cap 12 through the conduit 14 into the scrubber unit A carrying the dust and other solid particles.

As the gaseous stream enters the separator A it passes through the water spray from the drums 74 and 75. The water droplets will be accelerated in the direction of flow of the gaseous stream, however initially their velocity in the direction of the stream flow will be considerably slower than that of the incoming dust particles. Accordingly the pattern of droplets will provide targets for the incoming dust particles.

As the gaseous stream is directed to the venturi throat defined by the venturi rollers 35 and 36, the rapid increase in gas velocity will cause the water droplets to break down into smaller droplets and dust particles travelling at the same velocity as the gaseous stream will overtake and impinge upon the slower moving droplets. The probability that a dust particle will impinge upon a water droplet is increased as the stream converges in the venturi throat due to the extremely high turbulence. The turbulence has the additional beneficial effect of causing agglomeration of dust particles by inertial impaction with the water droplets. Also the reduced pressure in the venturi throat will cause condensation due to the vapor saturated condition of the gaseous stream. The condensation helps the particles to "grow" and the resulting wetness of the particles assists in their agglomeration.

The agglomerated particles leave the separator A through the outlet conduit 21 and travel to the air water separator C which is of cylindrical form. The gaseous stream enters the chamber of the separator C in a tangential manner and takes up a helical path of travel from the bottom upwardly toward the stack 22. The centrifugal force resulting from the swirling of the stream as it takes up a helical path, causes the agglomerated dust particles and water droplets to collect in an annular envelope adjacent the interior surface of the water separator C and then to gravitate toward the bottom of the separator where the contaminated water is drained out through the outlet pipe 23 and directed to a clarifier 24. From the clarifier 24 about 90 per cent of the scrubbing water is recirculated in its clarified form back to the water troughs 71 and 72 while the remaining 10 per cent of the water containing a high concentration of the contaminates is directed to a suitable disposal facility such as sludge beds or the like.

While the invention has been shown and described with respect to specific embodiments thereof this is for the purpose of illustration rather than limitation and other variations and modifications will be apparent to those skilled in the art upon a reading of the specification and claims. Therefore the patent is not to be limited in scope and effect to the specific embodiment shown and described herein or in any other manner that is inconsistent with the extent to which the progress in the art has been advanced by the invention.

I claim:

1. Apparatus for removing solid particles from particle laden gases in a gaseous stream, comprising:

a scrubber assembly interposed in said gaseous stream and having an inlet and an outlet for said stream, walls defining a passage for said stream, said passage having a converging upstream portion and a diverging downstream portion, said walls including a pair of opposed converging walls in said upstream portion and a pair of opposed diverging walls in said downstream portion, each converging wall and its corresponding diverging wall being spaced apart endwise from one another, means for producing a liquid spray adjacent said inlet whereby liquid droplets are mixed into and carried by said stream, and a pair of rollers with spaced parallel axes journaled in said unit and located with opposed cylindrical portions of the surfaces thereof positioned in opposite sides of said stream extending through the space between the respective converging and diverging walls of said passage to define a venturi throat with curved side walls that translate in the direction of said stream to reduce friction, and means for removing said water droplets and agglomerated solid particles from said stream.

2. Apparatus as defined in claim 1 including at least one spray drum and a trough of water upstream of said venturi throat, said drum having a bottom surface portion thereof immersed in water in said trough, means for maintaining a generally uniform water level in said trough and means for rotating said drum about its axis with sufficient surface velocity whereby water that clings to the surface of said drum is propelled tangentially in the form of a spray of droplets into the path of said stream.

3. Apparatus as defined in claim 2 including two of said spray drums, each having a water trough, said drums being located on opposite sides of said stream.

4. Apparatus as defined in claim 1 including means for adjusting the spacing between said rollers whereby to change the size of said venturi throat.

5. Apparatus as defined in claim 4 wherein said rollers are journaled on axels and including a pair of eccentric stub shafts located at the ends of each axle, each pair of stub shafts being coaxial and said axles being supported in said scrubber assembly by bearings in which said stub shafts are pivotally supported, and means for turning and locating said pairs of stub shafts at different angular positions about their respective axes whereby to change the location of said axles relative to one another.

6. Apparatus as defined in claim 5 wherein said means for turning said stub shafts about their respective axes comprises a lever connected to one of the stub shafts of each pair.

* * * * *